June 24, 1924.
H. L. HARMS
ANTISKID DEVICE
Filed Aug. 29, 1922
1,498,964
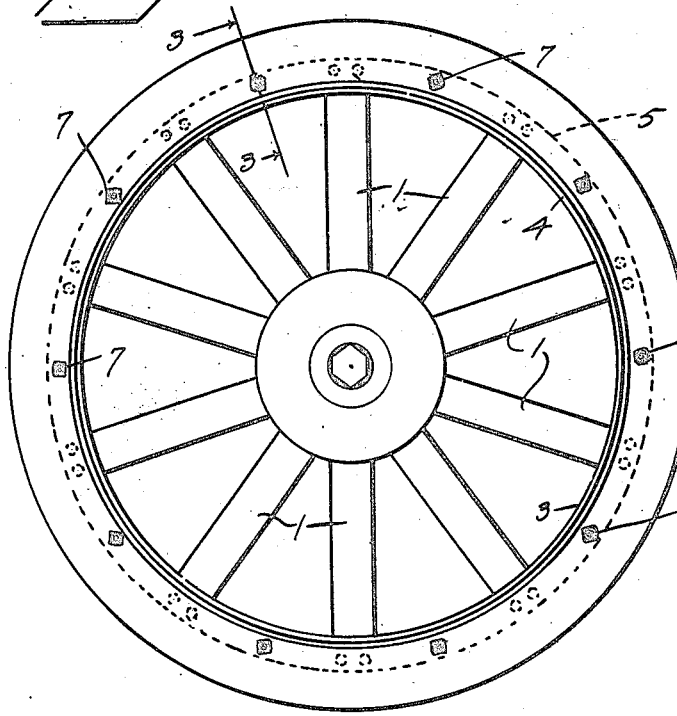
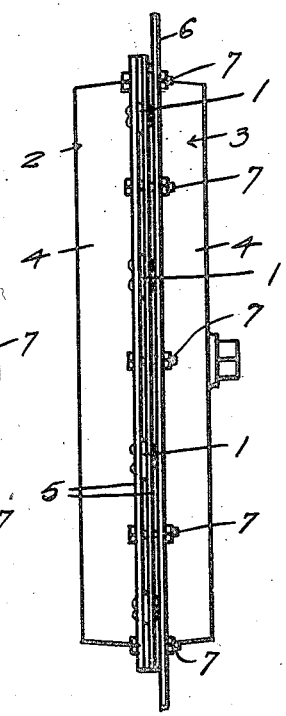
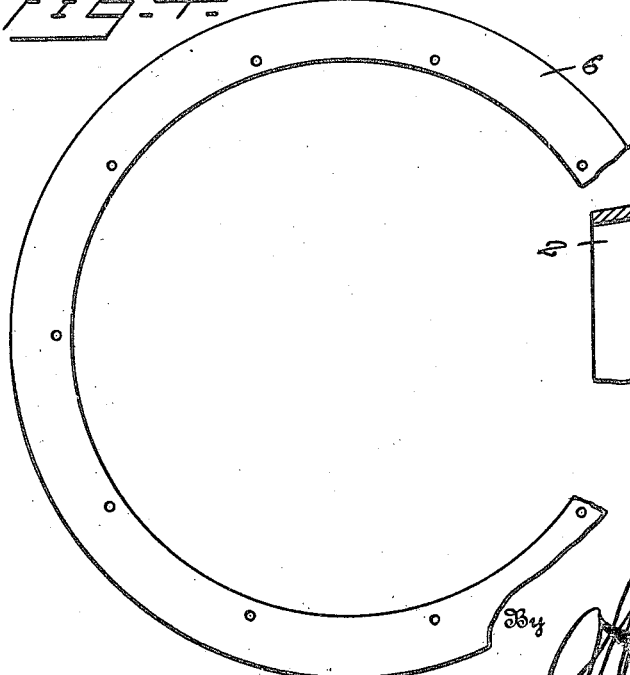
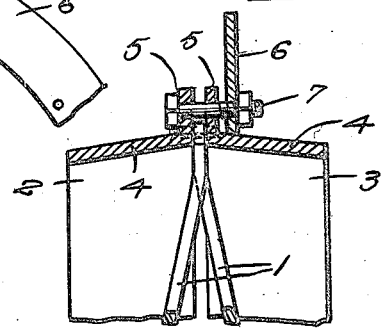
Inventor
H.L.Harms.
By
Attorney Patented June 24, 1924.

1,498,964

UNITED STATES PATENT OFFICE.

HERMAN L. HARMS, OF BENTON HARBOR, MICHIGAN.

ANTISKID DEVICE.

Application filed August 29, 1922. Serial No. 584,995.

*To all whom it may concern:*

Be it known that I, HERMAN L. HARMS, a citizen of the United States, residing at Benton Harbor, in the county of Berrien and State of Michigan, have invented certain new and useful Improvements in Antiskid Devices; and I do hereby declare the following to be a full, clear, and exact description of the invention, such as will enable others skilled in the art to which it appertains to make and use the same.

The invention has for its primary object to prevent side drifting and skidding of a tractor and to enable the same to make a short turn in loose and sandy soil.

The invention consists essentially of a flange adapted to be fitted to either side portion of the rim of the wheel and in either position to be attached to a center flange thereof.

A further object of the invention is the provision of a device of the character stated wherein a detachable flange is drawn onto a wheel having an inclined tread portion and a permanent flange, and in which the detachable flange when in its operative position firmly engages the inclined tread of the wheel.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a tractor wheel embodying the invention,

Figure 2 is a view in peripheral elevation of the wheel,

Figure 3 is a section on the line 3—3 of Figure 1, and

Figure 4 is a detail plan view of a fragmentary portion of the flange or ring.

Corresponding and like parts are referred to in the following description and designated in the several views of the drawings by like reference characters.

The tractor wheel embodies spokes 1 and a rim comprising complemental parts 2 and 3 having the outer ends of the spokes 1 secured therebetween. The members 2 and 3 are of similar construction, each consisting of a tread portion 4 and a flange 5, the latter being outwardly disposed and the part 4 having a substantially horizontal arrangement and slightly inclined whereby opposite tread portions 4 of the rim incline laterally and inwardly.

A detachable radially extending flange 6 consisting of a flat ring is adapted to be slipped upon either side portion 4 of the rim of the wheel and is bolted or otherwise secured to the outer flanges 5. The flange 6 prevents side drifting and skidding and enables the tractor to make a short turn in loose and sandy soil. The flange 6 is limited in its inward movement by wedging contact with either of the inclined tread portions of the rim, and openings in coincident position are formed in the flanges 5 and 6 and receive bolts 7, whereby the flange 6 is secured in position. The bolts 7 are disposed midway between the outer ends of adjacent spokes, thereby serving to connect the flanges 5 at points intermediate the spokes. The bolts 7 serve to draw the flange 6 towards the flanges 5 and the inner edge of the flange 6 is drawn onto and snugly engages the inclined surface of the tread portion 4 of the wheel.

What is claimed is:

In a tractor wheel having an outwardly disposed permanently secured flange intermediate the edges of the wheel rim and having the tread of the rim inclined laterally and inwardly from opposite sides of said flange, an anti-skid device comprising a radially extending detachable flat sided annular flange adapted to be slipped over the tread portion of the rim from either side of the first mentioned flange and to extend for a substantial distance beyond said flange in a radial direction only, and securing means passing through the permanently secured flange and said detachable flange and adapted to draw said detachable flange into close proximity to said permanently secured flange and onto the inclined portion of the rim to securely fasten the detachable flange to the rim by a wedging action and by said securing means.

In testimony whereof I affix my signature in presence of two witnesses.

HERMAN L. HARMS.

Witnesses:
K. E. SUTHERLAND,
W. F. CLEMENTS.